ELECTROGRAPHIC RECORDING APPARATUS

Filed May 9, 1958

INVENTORS
ROBERT E. BENN
RICHARD S. HOWELL
RICHARD S. SAKURAI
BY
Edward W. Hughes
ATTORNEY INVENTORS.
ROBERT E. BENN
RICHARD S. HOWELL
RICHARD S. SAKURAI
BY Edward W. Hughes
ATTORNEY INVENTORS
ROBERT E. BENN
RICHARD S. HOWELL
RICHARD S. SAKURAI
BY
Edward W. Hughes
ATTORNEY

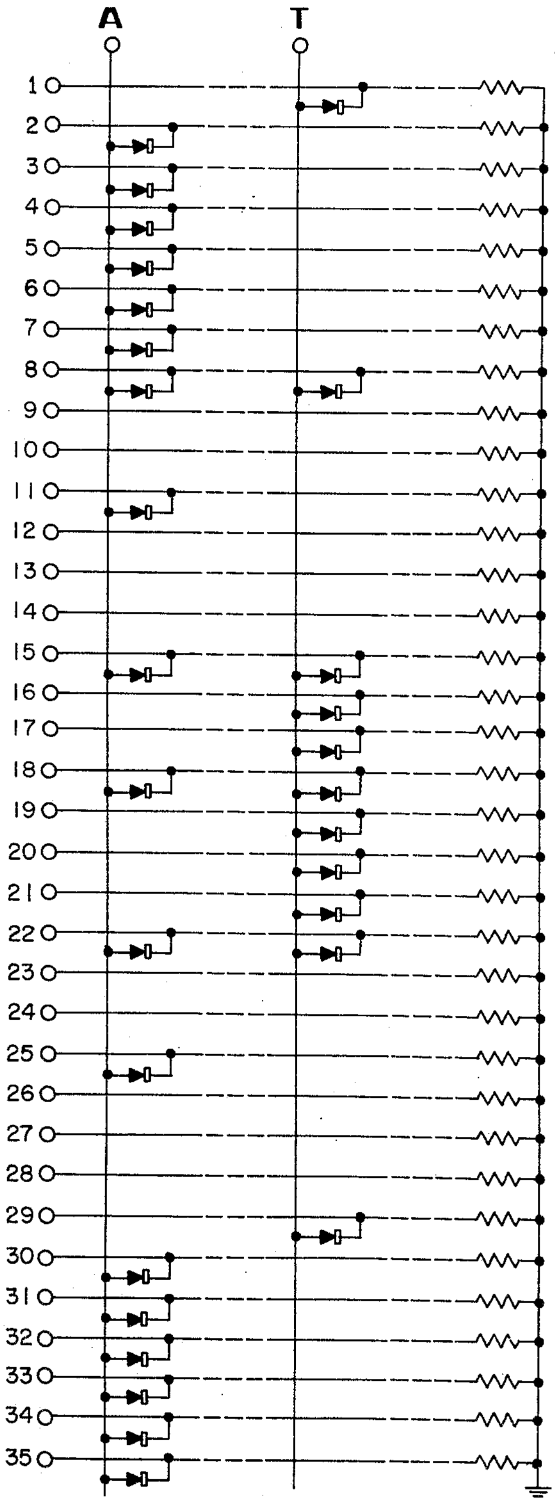
Fig. 7
| | | | | |
|---|---|---|---|---|
| 1 | 8 | 15 | 22 | 29 |
| 2 | 9 | 16 | 23 | 30 |
| 3 | 10 | 17 | 24 | 31 |
| 4 | 11 | 18 | 25 | 32 |
| 5 | 12 | 19 | 26 | 33 |
| 6 | 13 | 20 | 27 | 34 |
| 7 | 14 | 21 | 28 | 35 |
Fig. 8
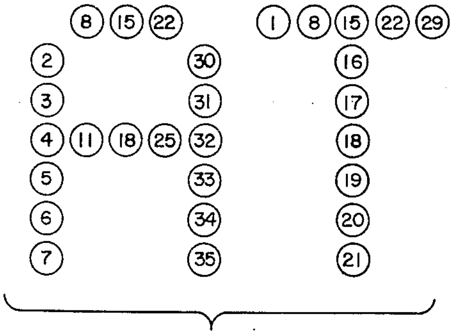
Fig. 9
INVENTORS.
ROBERT E. BENN
RICHARD S. HOWELL
RICHARD S. SAKURAI
BY Edward W. Hughes
ATTORNEY United States Patent Office 3,068,479
Patented Dec. 11, 1962

3,068,479

ELECTROGRAPHIC RECORDING APPARATUS

Robert E. Benn, Broomall, Richard S. Howell, King of Prussia, and Richard S. Sakurai, Wayne, Pa., assignors to Burroughs Corporation, Detroit, Mich., a corporation of Michigan Filed May 9, 1958, Ser. No. 734,253
19 Claims. (Cl. 346—74)

This invention relates to electrographic recording process and apparatus, and more particularly to improvements in the printing station of electrographic recorders.

The electrographic recording process consists broadly of three steps. The first step comprises establishing, or printing, electrically charged areas on selected portions of a recording medium, which areas are representative of information. The second step consists of developing such charged areas on the recording medium by making them visible, for example. The third step, which is optional, consists in fixing or rendering such developed areas substantially permanent. In the electrographic recording process, these three steps take place sequentially and at physically separate locations.

In copending patent application, Serial No. 729,847, filed April 21, 1958, entitled "Electrographic Recording Process and Apparatus," by Robert E. Benn and Richard S. Sakurai, which application is assigned to the assignee of this application, the advantages of positively initiating the establishment of a charged area on a recording medium by creating an electrical discharge between an initiating electrode and a print electrode are set forth. In the above identified application, a separate pulse generating source for each print electrode and each initiating electrode in a matrix print head is required. The simultaneous occurrence, or application, of print and initiating pulses to corresponding print and initiating electrode initiates the establishment of a charged area on the recording medium located in the gap between the pulsed print and initiating electrodes of the print head and a back electrode.

Great simplification in the printing station, in the structure of the print heads, and the necessary control and pulse generating circuitry required to print alphanumeric information, for example, results when one of the types of electrodes in the matrix print heads, the print electrodes, for example, are connected in parallel. Still greater simplification is possible if each row of parallel connected pin electrodes is replaced by a bar electrode.

A printing station comprised of a plurality of matrix print heads can be used in a page printer such as described in Patent No. 2,919,171, issued December 29, 1959, entitled "Page Printing Apparatus," by Herman Epstein and Robert J. Phelps, which patent is assigned to the assignee of this application. Print heads having print, or bar, electrodes, have the additional advantage, particularly when they are used in page printers, of selecting the position where each character will be printed.

In one form of a page printer having a plurality of matrix print heads, the initiating electrodes of each print head necessary to print a desired character are energized. A print pulse driver, however only energizes the print, or selection, electrodes of one of the print heads. Short electrical discharges occur between the energized initiating, or pin, electrodes and the energized selection electrodes of this one print head. Each of these discharges initiates an avalanche of charged particles which establish electrically charged areas on the recording medium. The charged areas printed by one print head at substantially one time will produce, when inked, a recognizable visible image of the desired character.

It is therefore an object of this invention to provide an improved printing head for an electrographic recording device.

It is another object of this invention to provide improvements in initiating the printing step and in controlling the position where the printing occurs in electrographic recording devices.

It is a further object of this invention to provide in an electrographic page printer, improved means for printing alphanumeric information and selecting the position where the information will be printed on the recording member.

It is a further object of this invention to provide improved means for printing alphanumeric information serially with a minimum of moving parts and a maximum of reliability.

It is still a further object of this invention to simplify the construction and circuit requirements of an electrographic printer.

Other objects and many of the attendant advantages of this invention will be readily appreciated as the same become better understood by reference to the following detailed description when considered in connection with the accompanying drawings, wherein:

FIG. 7 is a schematic view of part of a decoding matrix;

FIG. 8 is a chart identifying by number the initiating electrodes of a matrix print head; and FIG. 9 illustrates what initiating electrodes must have initiating pulses applied to them to print two sample letters.

Figure 3:
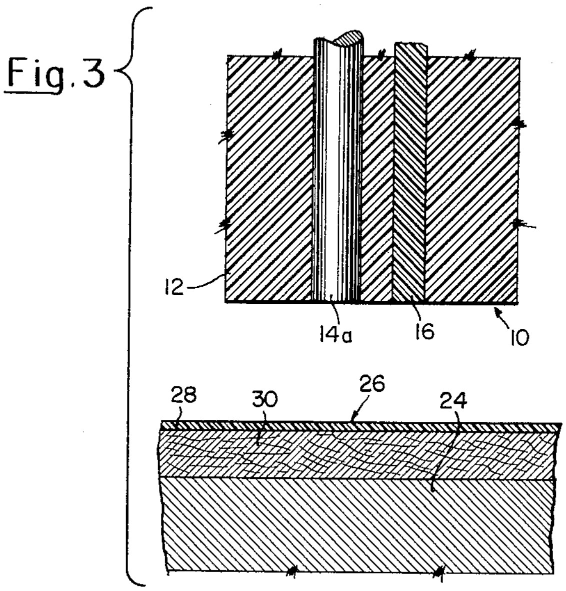
FIG. 3 is a partial sectional view taken on line 3—3 of FIG. 2.
Figure 1:
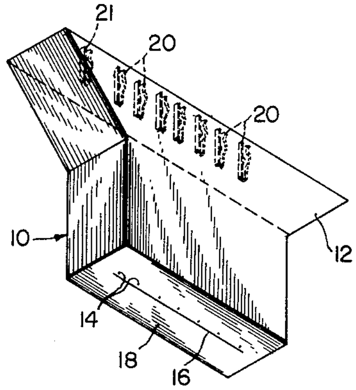
FIG. 1 is a perspective view of a print head comprising a single print bar and associated pin electrodes.

In FIG. 1, print head 10 is an example of one type of an electrographic recording print head. The body portion 12 of head 10 is preferably formed of a moldable material having high electrical resistance, such as an epoxy resin. The initiating electrodes 14 and the print electrode 16 terminate substantially flush with the substantially planar print face 18 of head 10. One of the terminals 20 is connected respectively to each of the initiating electrodes 14 and terminal 21 is connected to extended, or bar electrode 16.

Figure 2:
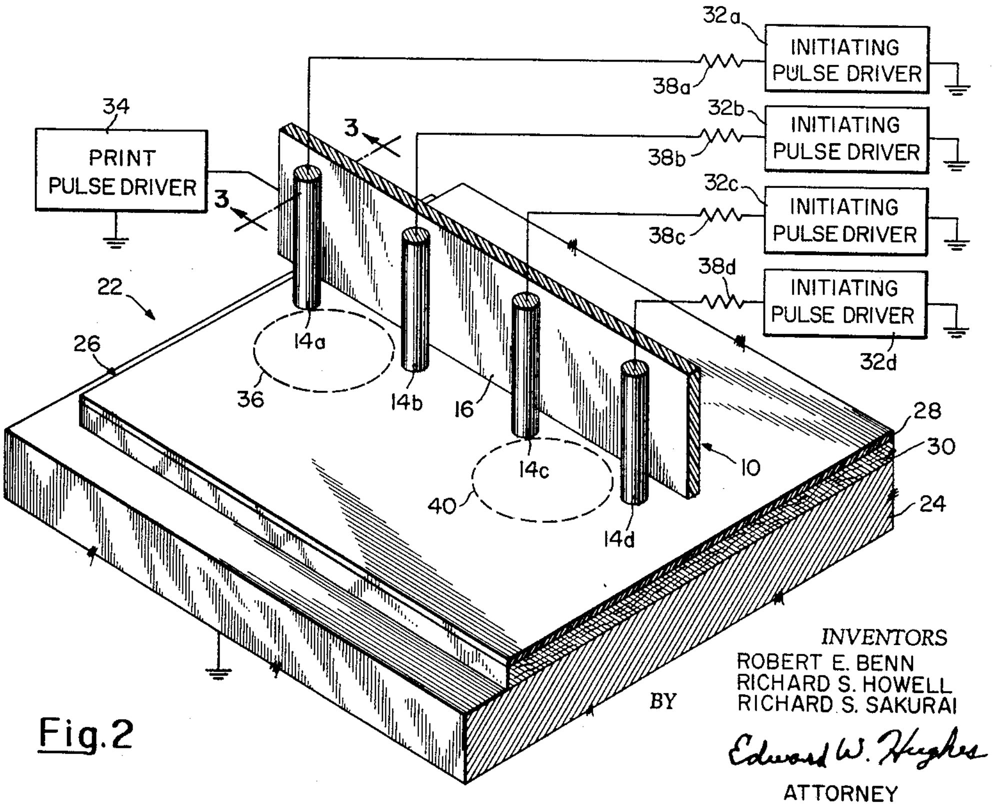
FIG. 2 is an enlarged perspective view of the printing station of an electrographic printer.

FIG. 2 is a greatly enlarged perspective view of part of printing station 22 of an electrographic recording device which is illustrated as being comprised of four initiating electrodes **14*a*, 14*b*, 14*c*, 14*d*, of the seven forming heads 10 and only that portion of bar 16 is illustrated which cooperates with electrodes 14*a* to 14*d*. The material forming body 12 has not been illustrated in order that the illustration of the operation of head 10 will be simplified. Spaced a substantially uniform distance from the lower surface of bar electrode 16 and the ends of pin electrodes 14 is an anvil, or back electrodes, 24. Conventional means for fixedly mounting print head 10 with respect to anvil 24 are not illustrated. Located in the gap between electrodes 14, 16 and back electrode 24 is the recording medium 26. Recording medium 26 is comprised of an electrical charge retentive, or dielectric layer, 28 and backing layer 30 which is, relative to layer 28, a good electrical conductor. Connected respectively to each of the pin, or initiating, electrodes 14*a*, 14*b*, 14*c*, 14*d*, is an initiating pulse driver 32*a*, 32*b*, 32*c*, 32*d*, for applying initiating voltage pulses to each of the pin electrodes 14a to 14d. Connected to bar electrode 16 is a print pulse driver 34. The pin electrodes 14 are preferably spaced a substantially uniform distance from the bar electrode 16** and are uniformly spaced from one another as can be seen in FIG. 2.

If an initiating voltage pulse having an amplitude of −1,000 volts, for example, is applied to pin electrode 14a by pulse driver 32a, the voltage between the pin 14a and back electrode 24 is insufficient to introduce by the field effect charged particles such as electrons, or ionized gas atoms and molecules into the space between electrode 14a and back electrode 24. No electrically charged area will be established, or printed, on the recording medium 26 solely by an initiating pulse applied to an initiating electrode. If a print voltage pulse of +500 volts, for example, is applied to bar 16, by print pulse driver 34, the electric field between the bar electrode 16 and dielectric layer 28 of medium 26 also is insufficient to introduce by the field effect charged particles into the space between bar electrode 16 and back electrode 24, and no charged area will be established on recording medium 26 solely by a print pulse being applied to a print electrode. However, if a print pulse is applied to print electrode 16 at the same time an initiating pulse is applied to initiating electrode 14a, the voltage between electrode 14a and bar 16 will be sufficient to cause either a disruptive, or a non-disruptive electrical discharge to occur between them. Either type of discharge will produce large numbers of electrically charged particles of both polarities.

The circuit for applying initiating pulses to each initiating electrode, for example, pulse driver 32a, and resistor 38a, is a high impedance circuit, which causes each electrical discharge between an initiating electrode to be of very short duration. Print pulse driver 34 has a relatively low impedance. Therefore, the occurrence of an initiating discharge between pin electrode 14a, and bar electrode 16, for example, will not produce any very perceptible change in potential of electrode 16, but will cause the potential of electrode 14a to approach that of electrode 16.

The strength of the print electric field between bar electrode 16 and recording medium 26, while insufficient to introduce charged particles into the field by the field effect as pointed out above, is sufficient to sustain cumulative ionization of charged particles once they are introduced into the print field. A discharge between electrode 14a and electrode 16 introduces large numbers of ionized gas molecules into the print electric field to initiate an avalanche of charge dparticles. The avalanche is propagated by the print electric field across the gap between head 10 and medium 26 to establish, under the circumstances as described above, a substantially circular charged spot 36 on recording medium 26. It should be noted that the gap is occupied by substatnially ambient atmosphere at substantially ambient pressures and temperatures. While the print field produced by the print pulse applied to bar 16 is sufficient to sustain cumulative ionization, it is insufficien to cause an avalanche, initiated by a single initiating discharge, for example, to spread, or extend itself, to form a charged area on medium 26 substantially under the complete length of bar electrode 16.

Since the potential of the bar 16 is positive, the polarity of the spot 36 is also positive. The exact mechanism by which the positively charged particles propagate across the gap between print head 10 and the surface of the recording medium 26 is not clearly understood; but it is believed that the presence of positively charged particles, such as ionized gases, intensifies the print electric field between bar 16 and recording medium 26 to produce ionization of gas molecules between the positively charged particles produced by the initiating discharge and the recording medium. Whatever the exact mechanism is, an avalanche of positively charged particles propagates across the gap in a manner similar to that of a Townsend avalanche which would be produced if the print pulse were negative. Since the time it takes for an avalanche to propagate across the gap is on the order of $10^{-9}$ seconds, or less, the print voltage pulse applied to the bar 16 may terminate shortly after an initiating discharge takes place between an initiating electrode and a print electrode.

If initiating voltage pulses are simultaneously applied to pins 14a, 14c, by circuits 32a and 32c, and while the initiating pulses are present, a print voltage pulse is present, or applied, to bar electrode 16 by circuit 34, an electrical discharge will take place between electrode 14a and bar 16 and between electrode 14c and bar 16. Each of these initiating discharges introduces large numbers of charged particles into the electric field between bar electrode 16 and recording medium 26. The charged particles produced by these two discharges initiate avalanches of charged particles which print or establish two charged areas such as areas 36, 40, on the charge retentive surface 28 of recording medium 26, substantially under pin electrodes 14a, 14c. It is not quite certain where the center of these printed spots 36, 40, are located with respect to the pin electrodes 14a and 14c and bar electrode 16, but it appears the center of each is somewhere under the portion of the space through which the discharge takes place which initiate the printing of spots 36, 40, respectively.

Figure 4:
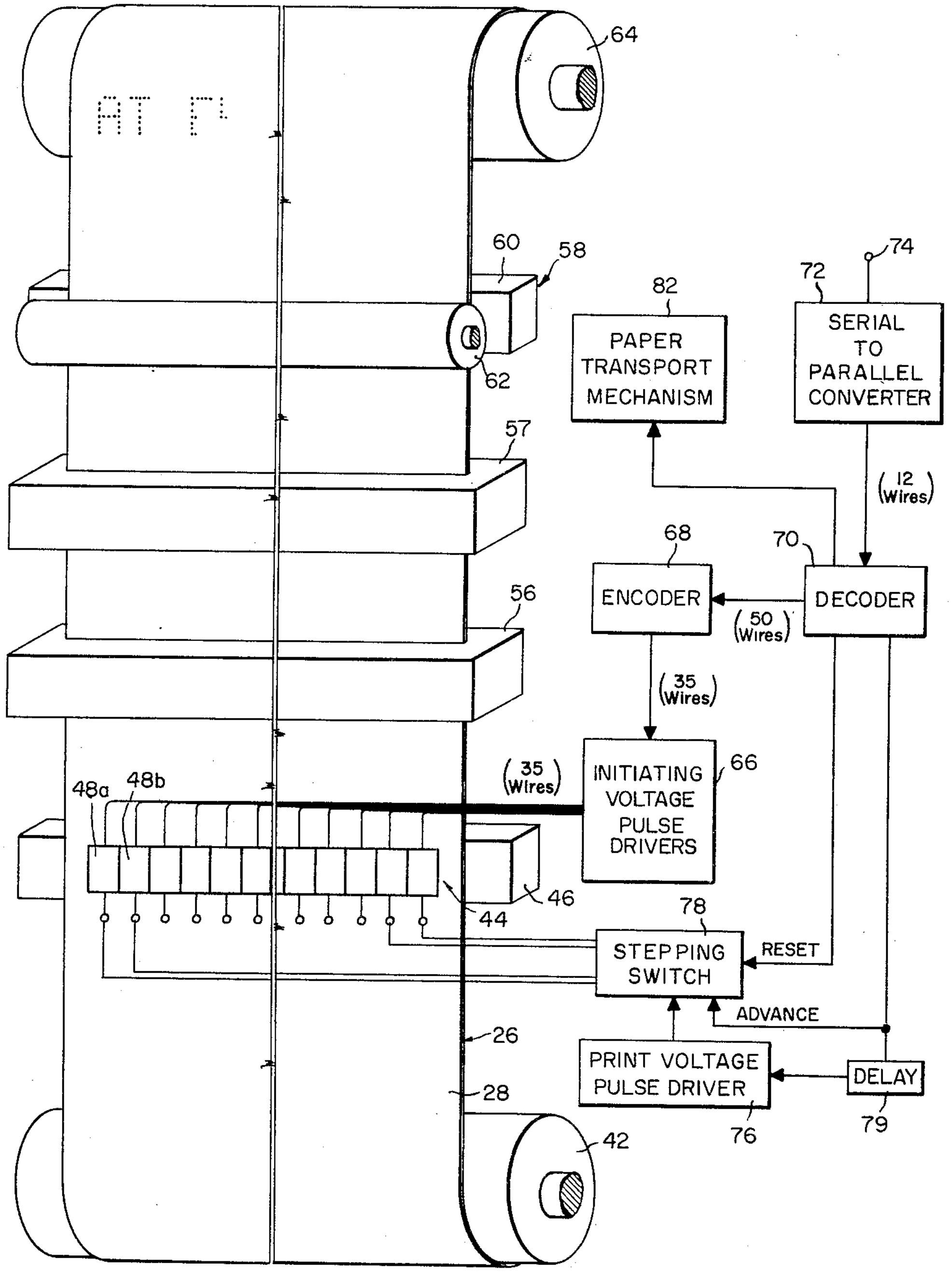
FIG. 4 is a block diagram of a page printer and the control circuitry for such printer.
Figures 5, 6:
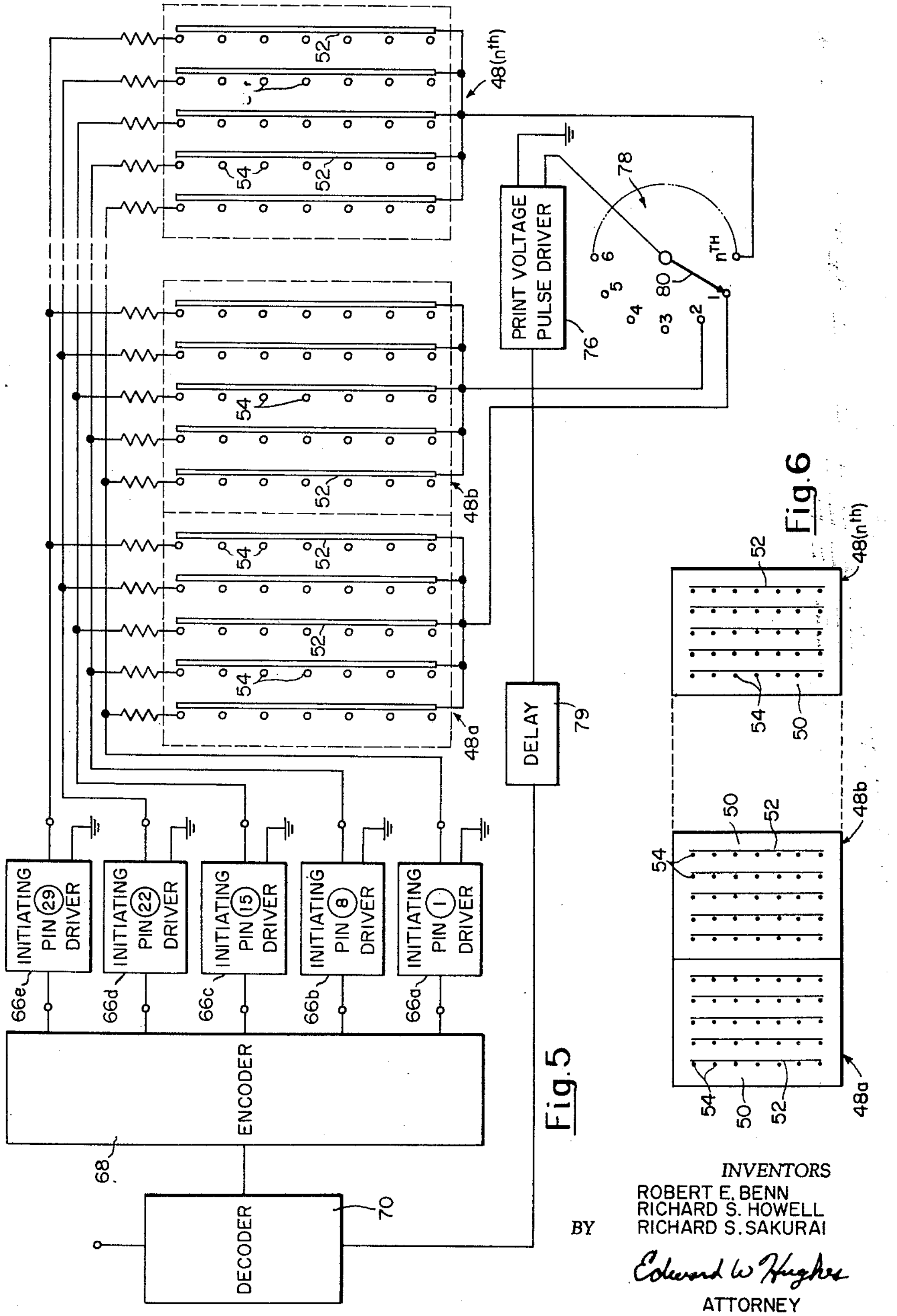
FIG. 5 is a enlarged schematic view of part of some of the print heads and associated circuitry of the page printer of FIG. 4.
FIG. 6 is an enlarged bottom view of the printing heads of the page printer of FIG. 4.

FIG. 4 is a schematic perspective view of a page printer in which the novel electrographic print heads find particular utility. The electrographic recording medium 26 is initially stored on supply roll 42. As medium 26 is unrolled, it passes through the printing station 44, which is comprised of an anvil or back electrode 46 and "*n*" printing heads 48, where "*n*" is an integer greater than 0. In a preferred example, "*n*" was made equal to 72. The print faces 50 of printing heads 48 are illustrated at a greatly enlarged scale in FIG. 6. In the embodiment illustrated, five print, or bar electrodes 52, terminate substantially flush with the print face 50 of each of the print heads 48. Associated with each bar electrode 52 are seven pin, or initiating electrodes 54. The thirty-five pin electrodes 54 of each printing head 48 are arranged in rows and columns to form an array, or a 5 x 7 matrix. The distance between adjacent pin electrodes is substantially uniform, and the minimum distance between a pin electrode and the nearest print electrode is made substantially uniform.

After passing through printing station 44, the medium 26 passes through inking station 56 where recording medium 26 is immersed in a conductive powdered ink, which ink adheres to and develops the charged areas established, or printed, on the charge retentive layer 28 at printing station 44. The forces between the ink particles and the charges deposited on the recording medium at the printing station are high, they are measured in thousands of "G's," so that some of the powdered ink will be strongly attracted to each charged area. A small amount of the ink will also lightly adhere to the uncharged areas of recording medium 26, but this ink is relatively easily removed by slight agitation and by a vacuum cleaner illustrated schematically at 57. In a preferred form, the dielectric surface 28 of the recording medium 26 is made of a thermoplastic material such as polyethylene. When this is the case, the developed printing is fixed in the fixing station 58 by heating recording medium 26 with an electric heater 60 until layer 28 becomes tacky, and then the powdered ink attracted to the charged areas is forced into intimate contact with the plastic by calendering roll 62. Recording medium 26 may then be taken up on take-up roll 64. Paper transport mechanism 82 of the printer, which may take any conventional form, is illustrated in block form.

Before describing the operation of a page printer, attention is first directed to FIG. 8 in which a number is arbitrarily assigned to each initiating electrode of a matrix print head. When an initiating pin corresponding to one of these numbers, and the print bars of the head are simultaneously energized, then an electrically charged area will be established at a position on the recording medium corresponding to the position of the initiating electrode in the matrix. When it is desired to print the letter "A," for example, then the initiating pins 2, 3, 4, 5, 6, 7, 8, 15, 22, 11, 18, 25, 30, 31, 32, 33, 34 and 35, will be simultaneously energized by their respective initiating pulse drivers. FIG. 9 shows the initiating pins that must be energized to print an "A" and a "T." All other alphanumeric information and most symbols can be printed by selecting proper ones of the initiating electrodes to be energized to print charged areas which, when developed, will form the desired character or symbol.

In a page printer of the type illustrated in FIG. 4, all of the initiating electrodes in the number one position will be connected to the number one initiating pin driver. All initiating pins of all the print heads in the number eight position will be connected to the number eight initiating pin driver, etc. as is illustrated in part in FIG. 5. In summary, initiating electrodes in corresponding positions in each print head 48 of the printing station 44 are connected in parallel to one of thirty-five initiating pulse drivers 66 illustrated in block form in FIG. 4. The determination of which of the pulse drivers will be energized at a given time is the function of encoder 68. The inputs to encoder 68 are the outputs of decoder 70. Decoder 70 determines from each group of input signals applied in parallel to it, either from a serial-to-parallel-converter 72 or from a tape reader, for example, which is not illustrated, the character, or function, associated with each group of signals applied to its input terminals, and energizes the output line which represents that character, or function.

When the input to the page printer is in the form of serial signals, the input signals are applied to input terminal 74 which is connected to serial-to-parallel-converter 72. The code which is applied to input terminal 74 may be of any suitable kind, such as the 5-bit Teletype code, or a 6-bit binary code. In serial-to-parallel-converter 72, information in the form of a serial group of signals is changed to corresponding parallel signals by mechanical means, such as are used in conventional Teletype receivers, by electrical analogs of such mechanical means, or by a serial read-in parallel read-out shift register, all of which are well known in the art. If a 6-bit code is being used, then the output of converter 72 is, after the six bits of one code group have been received, applied simultaneously to the 12 input terminals of the decoder matrix 70, which matrix may take the form illustrated in Patent No. 3,012,839, issued December 12, 1961, now application for Reissue S.N. 163,968, entitled "Electrographic Printer," by Herman Epstein and Frank T. Innes, assigned to the same assignee as this application. Depending on the composition of the signals of the code group applied to decoder 70, one of a total of 56 wires, for example, will be energized. Fifty of the output wires may represent the alphabet, numbers and selected symbols to be printed, and the other six will represent control functions such as paper advance, space, carriage return, spares, etc. An energized line from decoder 70, representing a given character such as the letter "A," for example, is in encoder 68, caused to energize the initiating pulse drivers having the numbers indicated in FIG. 9. In FIG. 7 the details of a decoder circuit for connecting the "A" and "T" lines from encoder 68 to the pulse drivers which must be energized to form the letters "A" and "T" are illustrated. The manner in which the full encoder 68 may be constructed to cause selected initiating pulse drivers to produce initiating pulses in order to print other alphanumeric information is believed to be straightforward and therefore is not illustrated.

Each initiating pulse driver to which a signal is applied by encoder 68 applies an initiating voltage pulse to all the corresponding initiating pins of all the heads 48 at the printing station. Thus when the "A" line from decoder 70 is energized, i.e., goes positive, the proper initiating electrodes of all the print heads 48 will have an initiating voltage pulse applied so that all the print heads 48 will be prepared to print the same letter, i.e., the letter "A." However, before an "A" is printed, it is necessary to apply a print pulse from print pulse driver 76 through a switch 78, for example, to the print electrodes 52 of one of the heads 48 while the initiating pulses are also present. Switch 78 can take any desirable form such as an electromechanical stepping switch, or an all electronic switching network.

In a preferred form, the widths of initiating pulses applied to each of the respective initiating pins 54 of the heads 48 may have a fairly substantial pulse width on the order of 100 to 500 microseconds. The interelectrode capacitance between adjacent pin electrodes causes the potential of non-energized initiating pins also to be changed. After a short period of time determined by the time constants of the circuits, the potential of these non-energized pins is reduced to a value which is not sufficient to cause a discharge to take place between a non-energized initiating electrode and its associated bar electrode, if the associated bar electrode is also energized by the print pulse driver.

In the embodiment of FIG. 4, decoder 70 produces a print and step signal for each code group applied to it. The signal applied to print pulse driver 76 is delayed by delay circuit 79, which may be a conventional delay line, or a monostable multivibrator. The delay is such that the print pulse is produced from 50 to 100 microseconds after the initiating voltage pulse has been applied to the initiating electrodes. The position of the movable arm 80 of stepping switch 78 in FIG. 5 determines the print head 48 to which a print pulse is applied. The signal which causes print voltage pulse driver 76 to be energized, energizes the means which cause arm 80 of stepping switch 78 to advance to the next position. Because of the inertia of the moving elements of switch 78, arm 80 of stepping switch 78 does not advance to its next position until after electrically charged areas have been established on the recording medium under print head 48*a*, for example.

As soon as a print pulse is applied to the print bars 52*a* of head 48*a*, for example, initiating discharges will take place between those initiating electrodes 54*a* which are energized by their respective initiating pulse drivers 66 and their associated print bar electrode 52*a*. These discharges initiate the printing, or establishment of charged areas, on the recording medium which form the desired character.

When the group of signals representative of the next character to be printed, the letter "T," for example, has been stored in serial-to-parallel-converter 72, this information is read out and applied to decoder 70 where one of the 50 lines representing the character "T," is energized. This energized line, through the action of encoder 68, causes those of the initiating voltage pulse driver 66, listed in FIG. 9, which form the character "T" to be energized and apply initiating voltage pulses to corresponding initiating pins of all the print heads 48 of the printing station 44. After a suitable time delay, print voltage pulse driver 76 will apply a print pulse to the print electrode of print head 48*b* through stepping switch 78 to initiate the printing of "T" on medium 26 under head 48*b*.

In this manner the characters are printed serially across the recording medium 26. If no information is to be printed by head 48*c*, for example, then stepping switch 78 is energized to advance arm 80 one position and pulse driver 76 will produce a print pulse which is applied to the print electrode of head 48c. However, nothing will be printed by head 48c since it takes the coincidence of a printing pulse on the print electrode and initiating pulses on the initiating electrodes to produce printing, and none of the initiating electrodes will be energized if none of the lines to encoder 68 are energized. When the end of a line has been reached, a signal corresponding to carriage return signal will cause the stepping switch 78 to reset to its initial position. A line feed signal applied to the paper transport mechanism means 82 will cause medium 26 to be advanced one line.

The use of the print electrode means and their associated initiating electrodes has eliminated the problem of creating a specialized atmosphere in the gap at the printing station. It also has eliminated the need for separate back electrodes for each print head, and an alignment of these back electrodes with the print heads as in prior electrographic recording page printers. By positive initiation of each discharge, the printing step occurs at relatively low voltages which reduces the problem of building the pulse driver circuits. The further advantage of printing heads having print and initiating electrodes is that they do not become contaminated and fail to print because of contaminants present at the printing station. The presence of the bar electrode also makes the head simpler to construct and also gives complete control over initiation of discharges and the position or heads at which these discharges occur.

In describing the manner of establishing the electrically charged areas at the printing station, such as printing station 44 of FIG. 4, the back electrode or anvil 46 has been indicated as being a conductor and being at reference potential. It is not essential that anvil 46 be a conductor in order for the printing step to occur as described. This is particularly true where the backing layer 30 of the recording medium has a relatively low electrical impedance. When this is the case, the function of the anvil 46 is solely that of maintaining the recording medium 26 at a substantially fixed distance from the print heads 48. In order to maintain the potential of the conductive layer of the recording medium 26 under the print head substantially at reference potential, an electrical connection may be made to the backing layer at some other more remote place than opposite the print faces of the print heads.

Because of the high impedance of initiating circuits, the discharges between initiating electrodes 54, and print electrodes 52 of any one of the print heads 48, for example, are of very short duration. The time constant of the circuit including initiating pins 54 and the time both a print pulse and initiating pulses are simultaneously present, or overlap, determines whether more than one initiating discharge is produced. Each initiating discharge will start an avalanche of charged particles. Each avalanche, in addition to the first, has the result of increasing the electrical charge density of the printed spots and also of slightly increasing their size. In order to achieve a high order of uniformity, in both spot size and charge density of the printed spots, it is desirable that each printed spot be produced by substantially the same number of avalanches. This is accomplished by controlling the widths and timing of the pulses and the impedance of the initiating electrode circuit.

When a negative print voltage is applied to the print electrode, negatively charged areas will be established on the recording medium, and when positive print pulses are applied to the print electrode, positively charged areas will be printed or established on the recording medium. The impedance of pulse drivers energizing print electrodes must be low and the impedance of pulse drivers energizing initiating electrodes must be high. By interchanging polarities of the pulses applied to the print and initiating electrodes; the polarity of the charged areas printed are also interchanged.

The explanation of the manner in which electrically charged areas are printed or established on a dielectric layer of a recording medium are the best explanations that have been developed to date. They are believed to be accurate and are supported by tests. They are, however, only the best explanations known to the inventors at this time.

Obviously many modifications and variations of the present invention are possible in the light of the above teachings. It is, therefore, to be understood that within the scope of the appended claims the invention may be practiced other than as specifically described and illustrated.

What is claimed is:

1. In an electrographic recorder, the improvements comprising: a plurality of matrix print heads, each head having a plurality of initiating electrodes and a numerically smaller plurality of print electrode means, high impedance means for applying initiating pulses to selected ones of the initiating electrodes of all the print heads in parallel, and low impedance means for applying a print pulse to the print electrode means of one of said print heads.

2. In an electrographic recording device: a plurality of print heads, each of said print heads comprising a plurality of initiating electrodes and print electrode means comprising fewer electrodes than the said plurality of initiating electrodes, adjacent initiating electrodes of each print head being substantially uniformly spaced from each other, and the minimum distance between each initiating electrode and said print electrode means being suibstantially uniform; a back electrode substantially uniformly spaced from the print electrode means of said print heads, means for selectively energizing, in parallel, corresponding initiating electrodes of each of the print heads, means for energizing the print electrode means of one print head whereby electrically charged areas will be established on the charge retentive surface of a recording medium located between the print head whose print electrode means were energized and the back electrode.

3. In an electrographic recording page printer having a printing station comprising an anvil and a plurality of matrix print heads spaced a substantially uniform distance from said anvil, each head having a plurality of pin electrodes arranged in a matrix: the improvement comprising print electrode means in each of said heads; a plurality of initiating pulse drivers; first circuit means adapted to receive signals representative of a given symbol and capable of transmitting a stimulation, corresponding uniquely to the given said symbol represented by said received signals, to output means; second circuit means for receiving said stimulation from said output means and for energizing, responsively thereto, in a plurality of said initiating pulse drivers those appropriate to the said symbol; connecting means for connecting in parallel homologous pin electrodes of each print head to an initiating pulse driver; a print pulse driver and switching means adapted to respond to signals from said first circuit means by applying a print voltage pulse to the print electrode means of one of said print heads; whereby an electrically charged latent image, recognizable when developed as said symbol, is printed on a recording medium located between the anvil and the print head to which the print pulse is applied.

4. In an electrographic recording page printer having a printing station comprising an anvil, and a plurality of matrix print heads spaced a substantially uniform distance from said anvil: the improvement comprising thirty-five initiating electrodes in each head; print electrode means in each of said heads; thirty-five initiating pulse drivers connected by high-impedance means respectively in parallel to the said initiating electrodes in homologous positions in each print head; first circuit means, responsive to suitable inputs, to cause selected ones of said thirty-five initiating pulse drivers, appropriate to a given symbol, to apply initiating voltage pulses to those initiating electrodes of said print heads connected to the said selected initiating pulse drivers; second circuit means adapted to respond to signals, applied thereto, representative of a given said symbol, by providing to said first circuit means said suitable inputs uniquely corresponding to said symbol, and by providing switching signals; a low impedance print pulse driver and switching means responsive to said switching signals from said second circuit means for applying a print voltage pulse to the print electrode means of one of said print heads; whereby an electrically charged latent image, recognizable when developed as said symbol, is printed on a recording medium located between the print head to which the print pulse is applied and the anvil.

5. In an electrographic recording page printer having a printing station comprising an anvil and a plurality of matrix print heads spaced a substantially uniform distance from said anvil, the improvement comprising: a plurality of initiating electrodes in each head; print electrode means in each of said heads; a plurality of initiating pulse drivers; high impedance circuit means connecting each of said pulse drivers to one group of initiating electrodes located one in a corresponding position in each print head; decoding means for receiving signals representative of a symbol and responsively thereto emitting a signal uniquely corresponding to the particular said symbol represented; encoding means adapted to receive from the said decoding means a signal corresponding to a particular symbol and responsively thereto to cause the energization of those initiating pulse drivers appropriate to excite those initiating electrodes corresponding to the formation of the said symbol; a low impedance print pulse driver responsive to signals from said decoding means for producing a print voltage pulse at a predetermined time interval after the commencement of application of the said initiating pulses to said initiating electrodes and before the termination thereof; and switching means responsive to signals from said decoding means for connecting said print pulse driver to the print electrode means of said print heads one head at a time and in sequence, whereby electrically charged areas, recognizable when developed as the symbols represented by each group of signals applied to said decoding means, are established on a recording medium located between the anvil and the print head to which the print pulse is applied.

6. In an electrographic recording device: a printing station comprising a print head having print electrode means and a plurality of pin electrodes, said pin electrodes being substantially uniformly spaced from and insulated from said print electrode means and from one another, and an anvil spaced a substantially uniform distance from the nearest portions of said pin electrodes and said print electrode means.

7. In a recording device: a electrographic printing station comprising a print head, said print head having a plurality of bar electrodes of substantially uniform length and width, said bar electrodes being substantially equidistantly spaced from one another and parallel to one another, a plurality of pin electrodes associated with each bar electrode, each of said pin electrodes being spaced a substantially uniform distance from the bar electrode with which it is associated, said pin electrodes being spaced a substantially uniform distance from one another, and a back electrode spaced substantially a uniform distance from said bar and pin electrodes of said print head.

8. In a recording device an electrographic printing station comprising: a matrix print head, said head having a print face, a plurality of pin electrodes terminating substantially flush with the print face, said pin electrodes at said print face being substantially uniformly spaced from each other and arranged in rows and columns, a plurality of print bars having boundaries substantially flush with the print face, one of said print bars being associated with each column of said pin electrodes, the minimum distance between the pin electrode and the associated print electrode being substantially uniform, and a back electrode spaced a substantially uniform distance from the print face of said print head.

9. A matrix type electrographic recording print head comprising: a body portion, said body portion having a substantially planar print face, a plurality of initiating electrodes having boundaries substantially flush with said print face, the intersection of said initiating electrodes and said print face forming a matrix array with said initiating electrodes arranged in rows and columns substantially at right angles to one another, a print electrode for each row of initiating electrodes, the minimum distance between each row of initiating electrodes and the closest print electrode being substantially equal.

10. An electrographic recording print head comprising: a body portion, said body portion having a print face, a print electrode and a plurality of initiating electrodes having boundaries substantially at said print face, said initiating electrodes being substantially uniformly spaced from each other at said print face and said print electrode being spaced from said initiating electrodes so that the minimum distance between an initiating electrode and a print electrode is substantially uniform.

11. An electrographic recording print head comprising: a body portion and a print face, a bar electrode, a plurality of pin electrodes, said bar and pin electrodes terminating substantially flush with said print face, said pin electrodes being substantially equidistantly spaced from each other at said print face and the minimum distance between each print electrode and said bar electrode being substantially equal.

12. In an electrographic recording device: at least one electrode of a first class denoted as "print electrodes"; a number, in excess of the number of said print electrodes, of electrodes of a second class denoted as "initiating electrodes," insulated from each other and from said print electrodes and each adjacent to a said print electrode and separated therefrom by a gap; at least one electrode of a third class denoted as "back electrodes" opposed to the said gaps between the said print electrodes and the said initiating electrodes; means for moving a recording medium between the said back electrodes and the said gaps; means, including insulation, for establishing between a said print electrode and more than one of the initiating electrodes adjacent to it an electrical potential difference sufficient to cause a separate disruptive discharge of electricity in each gap between the said print electrode and the said more than one of the initiating electrodes adjacent to it; means, including insulation, for establishing between the said print electrode and the said back electrode opposed to the gaps adjacent to the said print electrode an electrical potential difference insufficient to cause a disruptive discharge to the said back electrode, but sufficient to cause charges comprised by said disruptive discharge to move from each said disruptive discharge in a said gap toward the said back electrode and produce ionization in the atmosphere ambient in the path of motion of the said charges.

13. In an electrographic recording device, print electrode means comprising a print electrode opposed to a back electrode, means for advancing a dielectric record medium between said print electrode and said back electrode, means for causing, at various selected points of the said print electrode, localized disruptive electrical discharges in the atmosphere adjacent to the said print electrode, and means for producing between the said print electrode and the said back electrode an electric field sufficient to cause electric charges produced by the said disruptive discharges to move non-disruptively to the said dielectric medium and be deposited thereon.

14. In an electrographic recording device, print electrode means comprising a print electrode opposed to a back electrode and substantially uniformly spaced therefrom, means for advancing a dielectric record medium between said print electrode and said back electrode, means for causing, at various selected points of the said print electrode, localized disruptive electrical discharges in the atmosphere adjacent to the said print electrode, and means for producing between the said print electrode and the said back electrode an electric field sufficient to cause electric charges produced by the said disruptive discharges to move non-disruptively to the said dielectric medium and be deposited thereon.

15. In an electrostatic recording head comprising a printing electrode adapted to accelerate charges in a non-disruptive manner toward a dielectric recording medium, the improvement comprising means for producing separate discrete disruptive charge-producing electrical discharges between the same and selected separate regions of the said printing electrode.

16. An electrographic recording print head comprising: a body portion having a print face, a plurality of pin electrodes in the body portion, an extended electrode in the body portion approaching substantially equally near to each pin electrode, said pin electrodes and said extended electrode having boundaries substantially flush with the said print face and being electrically insulated from one another.

17. In an electrographic recording head, an extended printing electrode for accelerating charges in a non-disruptive manner toward a dielectric recording medium, an extensive dimension of the printing electrode being substantially parallel to the dielectric recording medium, a plurality of other electrodes each adjacent to a separate portion of the said extensive dimension of the printing electrode and each operable to produce a separate discrete disruptive charge-producing electrical discharge between the same and its adjacent separate portion of the printing electrode.

18. In an electrographic recording head, an extended printing electrode, and a plurality of other electrodes adjacent to the printing electrode but located opposite to different portions of the extensive dimension thereof, said other electrodes being selectively operable to produce separate discrete disruptive electrical discharges between the same and said different portions of the printing electrode.

19. In an electrostatic recording device, a print head, means for advancing dielectric recording media past the print head, a print electrode in the print head having an extensive dimension adjacent to and parallel to the path of travel of the recording media, means for causing, at various elected points along the extensive dimension of the print electrode, localized disruptive electrical discharges in the atmosphere adjacent thereto, and means for producing between the print electrode and a recording medium advanced past the print head a force field sufficient to cause electric charges produced by the disruptive discharges to move to the recording medium and form an electrostatic deposit thereon.

References Cited in the file of this patent

UNITED STATES PATENTS

| | | |
|---|---|---|
| 2,143,214 | Selenyi | Jan. 10, 1939 |
| 2,716,048 | Young | Aug. 23, 1955 |
| 2,830,867 | Kohn et al. | Apr. 15, 1958 |
| 2,898,468 | McNaney | Aug. 4, 1959 |
| 2,930,847 | Metzger | Mar. 29, 1960 |